United States Patent
Austin et al.

(10) Patent No.: US 11,467,044 B2
(45) Date of Patent: Oct. 11, 2022

(54) MULTI-CHANNEL REMOTE TEMPERATURE MONITOR

(71) Applicant: Microchip Technology Incorporated, Chandler, AZ (US)

(72) Inventors: John Austin, Chandler, AZ (US); Chihmin Yu, Chandler, AZ (US); Ezana Haile, Chandler, AZ (US); Sam Alexander, Chandler, AZ (US)

(73) Assignee: Microchip Technology Incorporated, Chandler, AZ (US)

(*) Notice: Subject to any disclaimer, the term of this patent is extended or adjusted under 35 U.S.C. 154(b) by 344 days.

(21) Appl. No.: 16/675,736

(22) Filed: Nov. 6, 2019

(65) Prior Publication Data

US 2020/0149982 A1 May 14, 2020

Related U.S. Application Data

(60) Provisional application No. 62/757,666, filed on Nov. 8, 2018.

(51) Int. Cl.
*G01K 15/00* (2006.01)
*G01K 7/00* (2006.01)

(52) U.S. Cl.
CPC ............ *G01K 15/005* (2013.01); *G01K 7/00* (2013.01)

(58) Field of Classification Search
None
See application file for complete search history.

(56) References Cited

U.S. PATENT DOCUMENTS

| | | | | |
|---|---|---|---|---|
| 4,858,615 A | * | 8/1989 | Meinema | G01D 3/022 73/1.88 |
| 4,933,633 A | * | 6/1990 | Allgood | G01R 35/04 324/141 |
| 5,352,938 A | * | 10/1994 | Wise | G01D 5/24476 327/58 |
| 6,392,372 B1 | * | 5/2002 | Mays, II | H02P 6/08 318/400.01 |
| 2004/0078097 A1 | | 4/2004 | Bruzy et al. | 700/48 |

FOREIGN PATENT DOCUMENTS

| | | | | |
|---|---|---|---|---|
| WO | 2015/158917 A1 | 10/2015 | | H04L 12/40 |
| WO | 2016/061476 A1 | 4/2016 | | G06F 13/42 |
| WO | WO-2016061476 A1 * | 4/2016 | | G06F 21/85 |

OTHER PUBLICATIONS

International Search Report and Written Opinion, Application No. PCT/US2019/060182, 11 pages, dated Apr. 17, 2020.

* cited by examiner

*Primary Examiner* — Raul J Rios Russo
*Assistant Examiner* — Carl F. R. Tchatchouang
(74) *Attorney, Agent, or Firm* — Slayden Grubert Beard PLLC

(57) ABSTRACT

A system includes a conditioning circuit, resistors connected to pins of the conditioning circuit, and measurement sensors connected to pins of the conditioning circuit. The conditioning circuit is configured to determine resistance values of the resistors and to determine a set of addresses for the measurement sensors based upon a combination of the resistance values of the resistors.

21 Claims, 3 Drawing Sheets

MULTI-CHANNEL REMOTE TEMPERATURE MONITOR

RELATED APPLICATION

The present application claims priority to U.S. Provisional Patent Application No. 62/757,666, filed Nov. 8, 2018, the contents of which are hereby incorporated in their entirety.

FIELD OF THE INVENTION

The present disclosure relates to temperature sensors and, more particularly, to a multi-channel remote temperature monitor with resistor programmable address combinations which are temperature channel specific.

BACKGROUND

Integrated circuit (IC) temperature sensors may be built as a stand-alone semiconductor device or package in order to more easily deploy temperature sensors in a larger system, such as a circuit board, server, mobile phone, tablet, or other suitable electronic device or system. The IC temperature sensors may include various signal conditioning functions and data conversion functions within its packaging. Such functions may be implemented within the sensor rather than offloading such functions to other elements, such as a central processing unit (CPU).

An IC temperature sensor may include a sensing element configured to generate a voltage or a current proportional to a temperature within a defined operational range. The sensing element may yield an output similar to, for example, a diode, transistor, transducer, thermocouple, thermistor, or resistance thermometer, albeit adjusted for noise. However, rather than simply outputting the voltage or current, the IC temperature sensor may perform signal conditioning on the voltage or current. The signal conditioning may reduce or remove noise, calibrate or normalize the voltage or current value, adjust the voltage or current value up or down, or map the voltage or current value to a defined operational range. Moreover, the IC temperature sensor may further perform analog to digital conversion on the voltage or current value to yield a digital representation of the temperature. The resolution of the analog to digital conversion of the IC temperature sensor may dictate the number of bits used in the digital representation of the temperature.

Furthermore, the IC temperature sensor may include components for generating address information identifying the IC temperature sensor among other IC temperature sensors. The address information may be used in systems wherein multiple sensors are used and networked together or otherwise communicatively coupled using a common bus.

Embodiments of the present disclosure may improve systems using temperature sensors by enabling addressing of temperature sensors without requiring such temperature sensors to generate address information. As a result, cheaper and simpler sensors, without the mechanisms to generate address information, may be used in such systems. Embodiments of the present disclosure may facilitate reuse of existing software and firmware that expect sensors to generate address information, as embodiments of the present disclosure may be compatible with such existing software and firmware. Embodiments of the present disclosure may be deployed to be used with such existing software and firmware without making substantive changes to such software and firmware.

SUMMARY

Embodiments of the present disclosure may include a circuit, also known as a conditioning circuit. The circuit may be implemented with analog circuitry, digital circuitry, instructions for execution by a processor, or any suitable combination thereof. The circuit may include pins. The pins may be input pins, output pins, or combination input and output pins, or a combination of input pins and output pins. The circuit may be configured to be connected to resistors and to measurement sensors through the pins. The circuit may be configured to determine resistance values of the resistors and to determine a set of addresses for the measurement sensors based upon a combination of the resistance values of the resistors. The sensors may be implemented in any suitable manner to generate a signal based upon measurement of any phenomena, such as temperature, strain, or electromagnetic signals.

In combination with any of the above embodiments, a first resistor may be connected to a first pin of the circuit, a second resistor may be connected to a second pin of the conditioning circuit, and a first and second measurement sensors may be connected to the conditioning circuit. In combination with any of the above embodiments, the first measurement sensor may be connected to the circuit at a third pin and a fourth pin. In combination of any of the above embodiments, the second measurement sensor may be connected to the circuit at a fifth pin and a sixth pin. In another embodiment, the second measurement sensor and the first measurement sensor may be both connected to the circuit at the third pin and the fourth pin. In such an embodiment, the measurement sensors may be connected to the third pin and to the fourth pin in opposite polarity or arrangement with respect to one another. For example, the measurement sensors may be arranged in opposite manners with respect to their respective sources, drains, or other terminals of a transistor.

In combination with any of the above embodiments, the conditioning circuit may be configured to determine a first resistance value of a first resistor, determine a second resistance value of a second resistor, and determine a set of addresses for the first measurement sensor and the second measurement sensor based upon a combination of the first resistance value and the second resistance value.

In combination with any of the above embodiments, the circuit may be further configured to assign unique addresses for each of the first measurement sensor and the second measurement from the set of addresses.

In combination with any of the above embodiments, the conditioning circuit may be further configured to assign unique addresses for each of the first measurement sensor and the second measurement from the set of addresses, including a first assignment of a first pin of the conditioning circuit to the first measurement sensor, and a second assignment of a second pin of the conditioning circuit to the second measurement sensor.

In combination with any of the above embodiments, the conditioning circuit may be further configured to assign unique addresses for each of the first measurement sensor and the second measurement from the set of addresses, including a first assignment of a first pin of the conditioning circuit to a first terminal of the first measurement sensor, a second assignment of a second pin of the conditioning circuit to a first terminal of the second measurement sensor, a third assignment of the first pin of the conditioning circuit to a second terminal of the first measurement sensor, and a fourth assignment of the second pin of the conditioning circuit to a second terminal of the second measurement sensor.

In combination with any of the above embodiments, the conditioning circuit may be further configured to periodically store measurements from the first measurement sensor and the second measurement sensor.

In combination with any of the above embodiments, the conditioning circuit is further configured to compare a first measurement from the first measurement sensor against a first threshold, compare a second measurement from the second measurement sensor against a second threshold, and, if the first measurement exceeds the first threshold or the second measurement exceeds the second threshold, issue an alert to a measurement monitoring process.

In combination with any of the above embodiments, the conditioning circuit is further configured to receive a query for a first address, the first address included in the set of addresses, from a host, and provide a measurement status of the first measurement sensor using an association of the first address with the first measurement sensor.

Embodiments of the present disclosure may include a system. The system may include the resistors and the measurement sensors to which any of the circuits of the above embodiments are configured to be connected. The system may include a host including a microcontroller, processor, instructions for execution by a processor, or any suitable electronic device in communication with the circuit and configured to use sensor data facilitated by any of the circuits of the above embodiments. The host may issue the query for the addresses. The availability of addresses for each of the sensors may cause the appearance of separate, addressable devices that will individually respond to a message directed to the address of the sensor from the host. However, all queries for such addresses may be evaluated and responded to by the circuit rather than the sensors. The operation of the circuit may be transparent to the host and to any software operating therein, in that the host may issue queries to the sensors and the circuit may answer such queries, but from the perspective of the host, an answer from the circuit may be indistinguishable from an answer directly from one of the sensors.

Embodiments of the present disclosure may include a method performed by any of the systems or circuits of the above embodiments.

DETAILED DESCRIPTION

Figure 1:
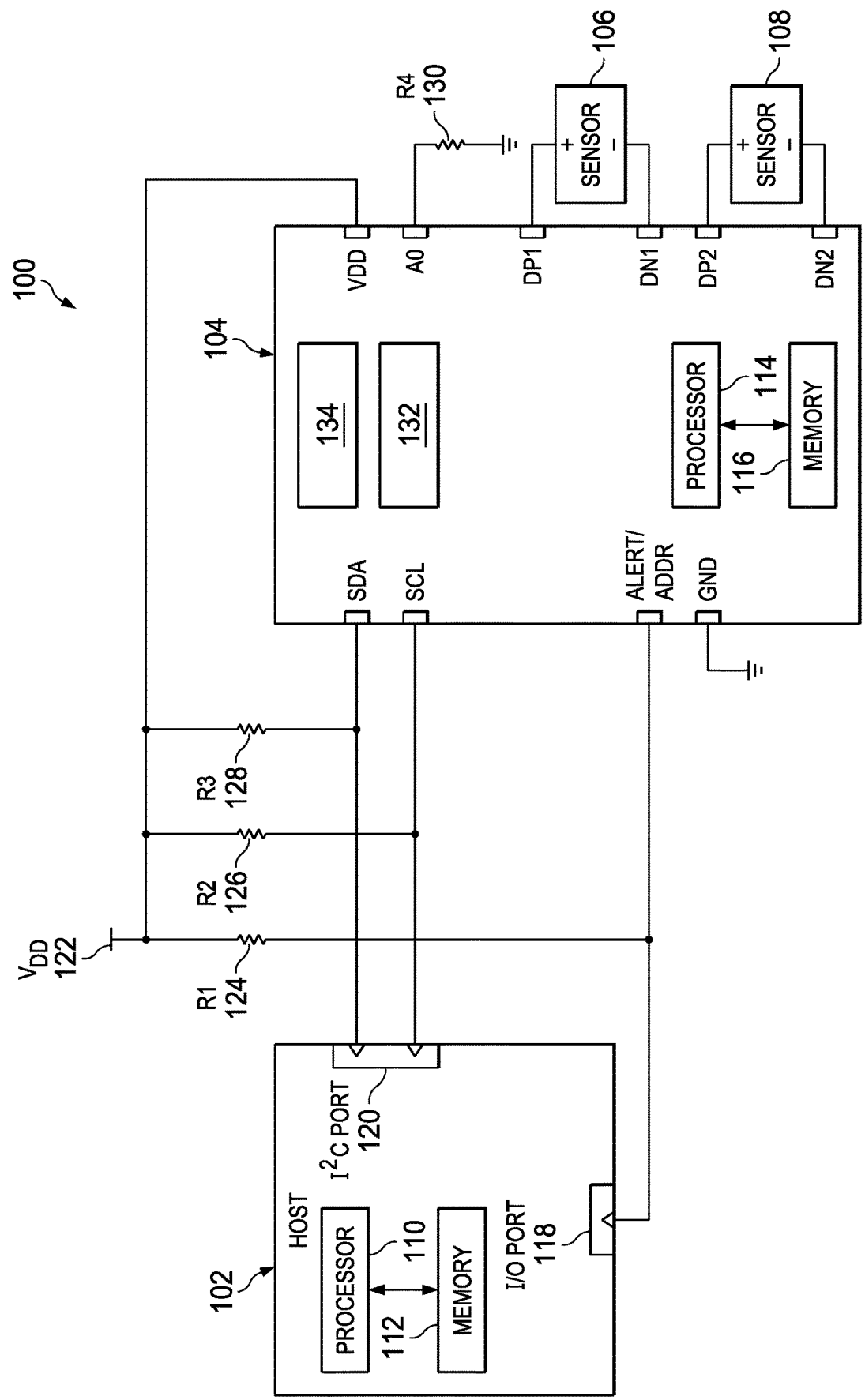
FIG. 1 is an illustration of a system for monitoring measurement sensors, according to embodiments of the present disclosure.

FIG. 1 is an illustration of a system 100 for monitoring measurement sensors, according to embodiments of the present disclosure. The sensors may measure any suitable phenomenon. For example, the sensors may measure pressure, strain, acceleration, temperature, or any other phenomenon for which a corresponding electrical signal is generated. Although any such sensors may be used, in the rest of the present disclosure, temperature is used as an example phenomenon.

System 100 may be configured to monitor temperature at remote locations. Such locations may be remote in that measurement of temperature in the different locations requires separate temperature sensors. System 100 may be configured to perform multi-channel temperature monitoring. Each such sensor may represent a channel of data or information. In one embodiment, system 100 may be configured to monitor temperature by accessing the sensors with an address that is mapped to a given sensor based upon combinations of values of resistors in system 100.

System 100 may include a host 102. Host 102 may be implemented by, for example, a microcontroller, computer, server, or other suitable electronic device. Host 102 may include a processor 110 and a memory 112. Processor 110 may be implemented by any suitable number and kind of microprocessors, processing cores, or other processing devices. Memory 112 may be implemented by any suitable mechanism for storing data or instructions to be used by processor 110. Host 102 may be configured to execute instructions stored in memory 112 with processor 110 to run programs, applications, scripts, firmware, or other software. Such software, such as a temperature monitoring program, may utilize measurements of temperature. Moreover, host 102 may be implemented using any suitable combination of analog or digital circuitry to perform temperature monitoring operations. Temperature monitoring applications may include, for example, monitoring the temperature of various parts of a circuit board, server, mobile phone, tablet, or other suitable electronic device or system and, given various temperature conditions, taking corrective action such as actuating cooling systems or providing alerts to users.

Host 102 may be configured to receive temperature measurements in any suitable manner. The temperature measurements may be in digital form. The temperature measurements may be in any suitable digital form or size, such as a suitable number of bits or a word. Host 102 may be configured to receive a given temperature measurement in response to polling a given sensor by the sensor's address.

The temperature may be monitored by any suitable number and kind of sensors. In the example of FIG. 1, system 100 includes two such sensors 106, 108. Sensors 106, 108 may each be implemented in any suitable manner. In one embodiment, sensors 106, 108 might not be configured to generate, provide, receive, or parse address information to or from mechanisms accessing sensors 106, 108. For example, sensors 106, 108 may be implemented by a transducer, thermocouple, thermistor, diode, or resistance thermometer without the ability to generate, provide, receive, or parse address information. In another example, sensors 106, 108 may be implemented by IC temperature sensors, albeit without the ability to generate, provide, receive, or parse address information. In another embodiment, sensors 106, 108 may be configured to generate, provide, receive, or parse address information to or from mechanisms accessing sensors 106, 108, but such mechanisms might not utilize such address information. For example, sensors 106, 108 may be implemented by IC temperature sensors with the ability to generate, provide, receive, or parse address information, but such functionality might not be utilized in communicating with host 102.

System 100 may include any suitable number and kind of elements to determine address information for sensors 106, 108. For example, system 100 may include a conditioning circuit such as circuit 104. Circuit 104 may be configured to map addresses of sensors 106, 108 to specific pins of circuit 104 on the basis of register values in system 100. Circuit 104 may be implemented in any suitable manner. For example, circuit 104 may be implemented by analog circuitry, digital circuitry, or any combination thereof. Moreover, circuit 104 may be implemented by instructions in a memory 116 for execution by a processor 114. Circuit 104 may be implemented as a semiconductor device, integrated circuit, or package. Circuit 104 may be implemented by a field programmable gate array, application-specific integrated circuit, or instructions or descriptions in a hardware description language implemented into a physical device.

Circuit 104 may be communicatively coupled to host 102 through any suitable mechanism, bus, or protocol. For example, circuit 104 may be communicatively coupled to host 102 with an I2C bus or through direct voltage or current input and output (I/O) connections. Host 102 may include an I2C port 120. Furthermore, host 102 may include an I/O port 118. Host 102 may be configured to send and receive address information from circuit 104 through I2C port 120. Furthermore, host 102 may be configured to receive various I/O data from circuit 104 through I/O port 118.

Circuit 104 may include any suitable number or kind of input or output pins or ports. The pins may be a multifunction pin, wherein a given pin can be used for both input and output, or for multiple modes of output or multiple modes of input, or a combination thereof. For example, a given pin may be routed to two different elements, wherein in a first mode the output of the pin is used by a first element and in a second mode the output of the pin is used by the second element. Circuit 104 may include suitable switching to enable the multifunction aspects of a pin. A pin may include any suitable connection to other elements of system 100. For example, circuit 104 may include a serial data (SDA) pin and a serial clock (SCL) pin. Circuit 104 may be configured to provide data to and receive data from other elements, such as host 102, through the SDA and SCL pins. The SDA and SCL pins may be configured to provide serial communication according to, for example, the I2C standard with host 102. The SDA and SCL pins may be communicatively coupled to I2C port 120 of host 120. A clock signal issued by host 102 may be used for synchronizing communication with circuit 104, wherein the clock signal is received through the SCL pin. Address information may be shared between host 102 and circuit 104 through the SDA pin. Circuit 104 may include a VDD pin and a ground pin for power. Furthermore, circuit 104 may include an alert pin (ALERT/ADDR), through which circuit 104 may be communicatively coupled to I/O port 118 of host 102. Circuit 104 may include any suitable number and kind of I/O pins with which to be communicatively coupled to sensors 106, 108 of system 100. For example, circuit 104 may include a DP1 pin and a DN1 pin, with which circuit 104 may be communicatively coupled to a positive terminal and a negative terminal, respectively, of sensor 106. In another example, circuit 104 may include a DP2 pin and a DN2 pin, with which circuit 104 may be communicatively coupled to a positive terminal and a negative terminal, respectively, of sensor 108. In one embodiment, circuit 104 may include combination-pins, wherein a single pin may be communicatively coupled to terminals of multiple sensors that may be successively accessed. Such an embodiment is shown further below within the context of FIG. 2. Although two sets of pins DP1/DN1 and DP2/DN2 are shown in FIG. 1, circuit 104 may include as many sets of pins as are needed to communicate with sensors of system 100.

In one embodiment, circuit 104 may include a sensor 132. Sensor 132 may be implemented by, for example, a transducer, thermocouple, transistor, transistor configured as a diode, thermistor, or resistance thermometer. Accordingly, in the example of FIG. 1, three temperature sensors 106, 108, 132 may be used to measure temperature of various parts of system 100. Each of temperature sensors 106, 108, 132 may be addressable with unique addresses. The addressing and routing of data to, or from, sensors 106, 108, 132 may be performed by circuit 104. Such addresses may be unique with respect to one another, or unique with respect to a larger set of networked elements. Sensors 106, 108, 132 may be addressed by host 102 using, for example, the I2C standard. Circuit 104 may be configured to access sensors 106, 108, 132 through direct connections without having to specify an address of a given sensor 106, 108, 132 to any other entity. For example, circuit 104 may be configured to access sensors 106, 108, 132 by issuing control signals along direct connections between circuit 104 and sensors 106, 108, 132. Circuit 104 may be configured to know, for a given direction connection, which of sensors 106, 108, 132 is connected through the direct connection. Host 102 may be configured to access sensors 106, 108, 132 through circuit 104 by specifying an address of the target sensor. The address of the target sensor may be translated by circuit 104 so that the given sensor may be accessed.

With respect to communication using the I2C standard, host 102 may be a master I2C device while sensors 106, 108, 132 may be slave I2C devices from the perspective of host 102. The SDA pin of circuit 104 may receive an address for a given sensor for which data is to be reported to host 102, or for which data is to be written. The address may be communicated using any suitable number of bits. For example, ten bits may be used to specify the address. In another example, eight bits may be used to specify the address, wherein seven bits are used to identify an address of the given sensor. The address may be virtual, emulated, or real. The address data may further include a bit to specify a read or write operation. When host 102 issues a command to a given sensor, host 102 may address the given sensor via by writing an address to the SDA pin of circuit 104 along with a write or read bit. Circuit 104 might not be a slave I2C device but may instead be configured to perform I2C communication on behalf of sensors 106, 108, 132. Sensors 106, 108, 132 might not be configured to perform I2C communication, or, if configured to perform I2C communication, such communication abilities might not be used in operation of system 100.

In order to facilitate I2C communication, system 100 may include several resistors. A resistor R1 124 may be connected between VDD 122 and a bus line between I/O port 118 of host 102 and the ALERT/ADDR pin of circuit 104. A resistor R2 126 may be connected between VDD 122 and a bus line between I2C port 120 of host 102 and the SCL pin of circuit 104. A resistor R3 128 may be connected between VDD 122 and a bus line between I2C port 120 of host 102 and the SDA pin of circuit 104. Circuit 104 may be connected to other pull-up or pull-down resistors, such as resistor R4 130 connected to ground. In one embodiment, circuit 104 may be configured to utilize the values of resistors 124, 126, 128, 130 to decode addresses of sensors 106, 108, 132. Circuit 104 may be configured to know the identity of a given sensor among sensors 106, 108, 132. Such an identity may be, for example, hard-coded or programmed into circuit 104 and stored in any suitable manner, such as in a look-up table.

Circuit 104 may be configured to poll a given sensor in any suitable manner. Sensors 106, 108, 132 may be polled to query the sensor, for example, for a temperature measurement, a temperature change, or whether a temperature has exceeded a given threshold. Circuit 104 may be configured to issue signals, such as voltage or current, to a given sensor that will cause a polling of a given sensor. The signals may be issued through pins connecting circuit 104 to the given sensor. In another example, polling may be performed simply by connecting a voltage across, or current through, the given sensor.

In one embodiment, circuit 104 may be configured to perform A/D conversion on temperature measurements from sensors 106, 108, 132. Furthermore, processor 114 of circuit 104 may be configured to compare the value of the measurements against known, threshold values. Processor 114 of circuit 104 may be configured to identify such a measurement exceeding a threshold (whether going above an upper threshold or going below a lower threshold) as a threshold event. In another embodiment, circuit 104 may be configured to store threshold values of unconverted analog signals from sensors 106, 108, 132 in memory 116. Furthermore, circuit 104 may be configured to compare the value of the unconverted measurement against known, threshold values. Circuit 104 may be configured to identify such a measurement exceeding a threshold (whether going above an upper threshold or going below a lower threshold) as a threshold event. Upon determination of a threshold event, circuit 104 may be configured to communicate the threshold event to host 102. Measurements from sensors 106, 108, 132, or comparisons of such measurements to thresholds, may be stored by, or in, circuit 104. Such measurements or comparisons may be stored in, for example, registers of memory 116.

When circuit 104 detects a threshold event for any of sensors 132, 106 108, circuit 104 may issue an alert signal on the ALERT/ADDR pin to I/O port 118 of host 102. The alert signal may be a pulse, active-high, or active-low. The alert signal may persist, for example, as long as the threshold event continues to exist, or when host 102 overrides the alert signal.

Upon receipt of a notification of a threshold event, host 102 may be configured to determine which of sensors 106, 108, 132 caused the threshold event. Host 102 may be configured to poll or query each sensor of sensors 106, 108, 132 to determine the measurement from the respective sensor. However, as discussed above, sensors 106, 108, 132 might not generate, provide, receive, or parse address information. Circuit 104 may be configured to perform such functions on behalf of sensors 106, 108, 132.

Host 102 may be configured to address sensors 106, 108, 132 using a communication protocol of system 100 such as I2C. Thus, host 102 may issue polling messages or queries through I2C port 120 using the I2C address of a given one of sensors 106, 108, 132. Host 102 might assume that sensors 106, 108, 132 are implemented using the selected communication protocol, such as I2C, and issue the polling messages or queries based upon that assumption. However, as discussed above, sensors 106, 108, 132 might not have capabilities for communicating with the selected communication protocol, and circuit 104 may receive, parse, and respond to the polling messages or queries on behalf of sensors 106, 108, 132. Circuit 104 may return responses to host 102, emulating the responses that sensors 106, 108, 132 would generate as-if sensors 106, 108, 132 were implemented according to the selected communication protocol.

Each of sensors 106, 108, 132 may generate data and be configured as a channel of data. Configurations—such as addresses, threshold measurement values, scaling, offsets, or other signal conditioning—of each of sensors 106, 108, 132 may be uniquely implemented. The different configurations of each of sensors 106, 108, 132 may be implemented by unique values, or combinations of values, of resistors R1 124, R2 126, R3 128, R4 130. A developer or designer of a particular implementation of system 100 may choose specific values of resistors R1 124, R2 126, R3 128, R4 130. Circuit 104 may be configured to determine the particular values of resistors R1 124, R2 126, R3 128, R4 130 at any suitable time, such as periodically or at start-up. Circuit 104 may be configured to determine the particular values of resistors R1 124, R2 126, R3 128, R4 130 in any suitable manner. For example, given a measured voltage at the ALERT/ADDR pin of circuit 104, and a known value of VDD 122, or a known current value measured at the ALERT/ADDR pin of circuit 104, the value of resistor R1 124 may be calculated. Given a known current or voltage at the AO pin of circuit 104, the value of resistor R4 130 may be calculated.

The values of resistors R1 124, R2 126, R3 128, R4 130 may be used to specify which specific set or range of I2C addresses that are to be used to address the sensing elements of the system. The values of resistors R1 124, R2 126, R3 128, R4 130 may be selected by a designer of system 100 from a list of possible resistor values that may be expected by circuit 104. Any suitable resistor value may be included in such a list of possible resistor values. For example, 100-, 110-, 120-, 130-, 150-, 160-, 180-, 200-, 220-, 240-, 270-, 300-, 330-, 360-, 390-, 430-, 470-, 510-, 560-, 620-, 680-, 750-, 820-, 910-, 1000-, 1100-, 1200-, 1300-, 1500-, 1600-, 1800-, 2000-, 2200-, 2400-, 2700-, 3000-, 3300-, 3600-, 3900-, 4300-, 4700-, 5100-, 5600-, 6200-, 6800-, 7500-, 8200-, or 9100-ohm resistors may be used, each with a tolerance of +/−5%. Thus, upon determining that a given resistor is within 5% of any resistor value in the list of possible resistor values, circuit 104 may be configured to determine that the given resistor matches the corresponding resistor value in the list.

The defined resistance value of a given resistor in system 100 may be used as a coded value in specifying a set or range of I2C addresses to be used. For example, a 100-ohm resistor may represent a coded value of "1", and a 9100-ohm resistor may represent a coded value of "48", wherein the other coded values of 2-47 are assigned to the intervening resistors in the list above. Moreover, any suitable combination of resistor values of resistors R1 124, R2 126, R3 128, R4 130 may be used to define a series of coded values that, when put together, are an identification for a set of addresses. For example, resistor values for R1 124 and R4 130 may be used as an identifier for a set of addresses of sensors 106, 108, 132. More or fewer resistor values in system 100 may be used. R1 124, as a pull-up resistor, may have a coded value that is referenced herein as Up, and R4 130, as a pull-down resistor, may have a coded value that referenced herein as Down. Thus, upon determining a coded value of R1 124 as Up and a coded value of R4 130 as Down, circuit 104 may be configured to reference a look-up table 134 or other data structure using a given (Up, Down) pair to index the table. Each entry in look-up table may include addresses for a set of sensors. Each unique permutation of (Up, Down) may be associated with a different set or range of addresses that are to be used to address sensors 106, 108, 132.

Circuit 104 may be configured to store look-up table 134, or access look-up table 134 as implemented in any other suitable part of system 100. After determining the values of resistors 124, 130 and determining a coded representation (Up, Down), circuit 104 may be configured to look up the pair (Up, Down) in look-up table 134 and access the associated set of addresses for sensors 106, 108, 132. For example, if R1 124 is 110-ohms and R4 130 is 110-ohms, the pair (Up, Down) may be (2,2) and the corresponding entry in look-up table 134 may be (0000001, 0000010, 0000011). These are merely example values for resistors and addresses, and any suitable combination of these may be used.

Circuit 104 may assign temperature sensors 106, 108, 132 to the addresses within the set or range of I2C addresses indicated by the values of the resistors. Circuit 104 may be configured to assign sensors to addresses in any suitable manner. For example, circuit 104 may assign a first address (0000001) from the set or range of I2C addresses retrieved from look-up table 134 to the sensor (in this example, sensor 106) whose positive input is on the DP1 pin of circuit 104. Circuit 104 may assign a second address (0000010) from the set or range of I2C addresses retrieved from look-up table 134 to the sensor (in this example, sensor 108) whose positive input is on the DP2 pin of circuit 104. Circuit 104 may assign a third address (0000011) from the set of or range I2C addresses retrieved from look-up table 134 to the internal sensor (in this example, sensor 132) of circuit 104. The assignment of addresses to sensors may thus follow a pinout specification of circuit 104. The assignment of addresses may be made internally to circuit 104 for use by circuit 104; individual sensors 106, 108, 132 might not receive or utilize such an assignment of addresses. Addresses of sensors 106, 108, 132 may be communicated to other elements, such as host 102.

When host 102 issues queries or polling messages to a given sensor, circuit 104 may be configured to respond to such queries or polling messages on behalf of the given sensor according to the assignment of addresses to sensors. For example, host 102 may issue a request for a reading for sensor 106 with address (00000001) from the address set (0000001, 0000010, 0000011). Circuit 104 may be configured to respond with the measurement or status taken from the previous measurement of sensor 106. Measurements from sensors 106, 108, 132 may be stored in registers of memory 116. In the example where host 102 issues a request for a reading using the address (00000001), circuit 104 may be configured to receive the address portion of the request, map the address to the sensor 106 connected to the DP1 pin of circuit 104, and read and return the measurement stored for such a sensor to host 102. Similarly, when host 102 issues a request for a reading using the address (00000010), circuit 104 may be configured to receive the address portion of the request, map the address to the sensor 108 connected to the DP2 pin of circuit 104, and read and return the measurement stored for such a sensor to host 102. Furthermore, when host 102 issues a request for a reading using the address (00000011), circuit 104 may be configured to receive the address portion of the request, map the address to the internal sensor 132 of circuit 104, and read and return the measurement stored for such a sensor to host 102.

For host 102 and software applications operating therein, the availability of addresses for each sensor 106, 108, 132 may cause the appearance of separate, addressable devices that will individually respond to a message directed to the address of the sensor. However, all queries for such addresses may be evaluated and responded to by circuit 104 rather than sensors 106, 108, 132. The operation of circuit 104 may be transparent to host 102 and the software operating therein in that host 102 may issue queries to sensors 106, 108, 132 and circuit 104 may answer such queries, but from the perspective of host 102, an answer from circuit 102 may be indistinguishable from an answer directly from one of sensors 106, 108, 132. Accordingly, software or firmware written for a conventional temperature monitoring system wherein sensors are implemented using the I2C standard might require no changes, modifications, or other adaptations to be executed on host 102 in FIG. 1 in combination with circuit 104. In the I2C standard, host 102 might assume that all devices, such as sensors 106, 108, 132, are listening on a common bus but responding only to those messages that uniquely address the given sensor. However, embodiments of the present disclosure remove the requirement that sensors 106, 108, 132 include mechanisms for communication using the standard, or even listen to the common bus. Instead, circuit 104 may perform such functions on behalf of sensors 106, 108, 132.

Embodiments of the present disclosure may reduce customer cost while maintaining code compatibility of existing temperature monitor software, drivers, or firmware. Embodiments of the present disclosure may allow an integrated circuit temperature sensor to be replaced with a simpler sensor. This may provide a significant cost savings for multi-zone sensing applications. Circuit 104 may mimic a standard temperature sensor IC while utilizing cheaper sensor technology.

Figure 2:
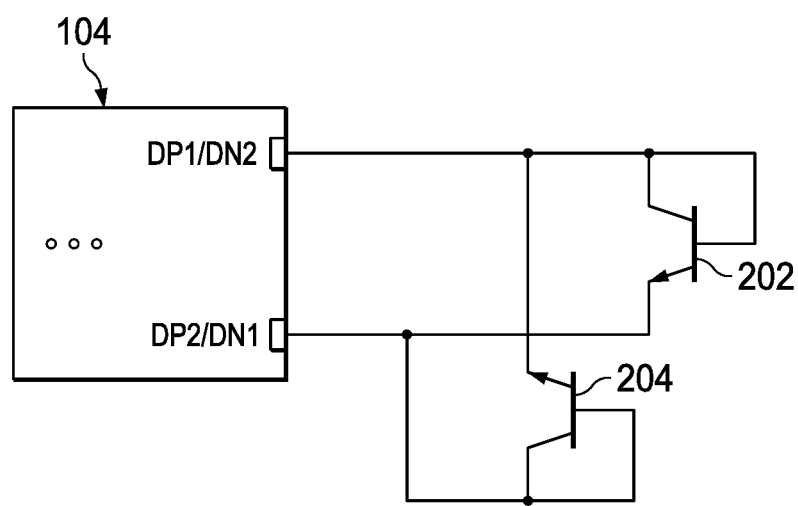
FIG. 2 is an illustration of the system using an alternative pinout of a conditioning circuit and a more particular implementation of sensors, according to embodiments of the present disclosure.

FIG. 2 is an illustration of system 100 using an alternative pinout of circuit 104 and more particular implementation of sensors, according to embodiments of the present disclosure. Sensors 202, 204 may implement sensors 106, 108 of FIG. 1 as transistors. In the pinout of circuit 104 in FIG. 2, pins for DP1 and DN2 may be combined, and pins for DP2 and DN1 may be combined. The remainder of the pinout of circuit 104 and the remainder of system 100 may be the same as shown in FIG. 1.

Sensors 202, 204 may be implemented by transistors, diodes, or any other suitable electronic device. The DP1/DN2 pin may be connected to a positive terminal or a source/collector of sensor 202 and to a gate/base of sensor 202. Furthermore, the DP1/DN2 pin may be connected to a negative terminal or a drain/emitter of sensor 204. The DP2/DN1 pin may be connected to a positive terminal or a source/collector of sensor 204 and to a gate/base of sensor 204. Furthermore, the DP2/DN1 pin may be connected to a negative terminal or a drain/emitter of sensor 202.

Circuit 104 may be configured to alternatively obtain measurements from sensor 202 and sensor 204. In a first phase, circuit 104 may apply a positive voltage or current through the DP1/DN2 pin. The positive voltage or current, as-applied to the source/collector of sensor 202 and the gate/base of sensor 202, causes sensor 202 to allow current to flow through sensor 202. The resultant current may flow from the drain/emitter of sensor 202 back to the DP2/DN1 pin. Circuit 104 may be configured to measure such current. Sensor 202 may be configured to produce a current whose relationship to input current or voltage and temperature is known. From this relationship, the output of sensor 202 may thus reflect a temperature measurement. Circuit 104 may determine and store this temperature measurement. During the first phase, the lack of positive voltage or current issued through the DP2/DN1 pin as-applied to the gate/base of sensor 204 may prevent sensor 204 from issuing its own output. Sensor 204 may be effectively deactivated during the first phase.

In a second phase, circuit 104 may apply a positive voltage or current through the DP2/DN1 pin. The positive voltage or current, as-applied to the source/collector of sensor 204 and the gate/base of sensor 204, causes sensor 204 to allow current to flow through sensor 204. The resultant current may flow from the drain/emitter of sensor 204 back to the DP1/DN2 pin. Circuit 104 may be configured to measure such current. Sensor 204 may be configured to produce a current whose relationship to input current or voltage and temperature is known. From this relationship, the output of sensor 204 may thus reflect a temperature measurement. Circuit 104 may determine and store this temperature measurement. During the second phase, the lack of positive voltage or current through the DP1/DN2 pin as-applied to the gate of sensor 202 may prevent sensor 202 from issuing its own output. Sensor 202 may be effectively deactivated during the second phase.

Circuit 104 may be configured to alternate the first phase and the second phase periodically using any suitable time period, or upon-demand when a measurement from a given one of sensors 202, 204 is needed. In embodiments wherein system 100 includes additional sensors (not shown) external to circuit 104, pairs of such sensors may similarly share additional output pins (not shown) of circuit 104. If such sensors are represented with enumeration, in such embodiments, circuit 104 may take measurements from odd sensors in the first phase and may take measurements from even sensors in the second phase.

Figure 3:
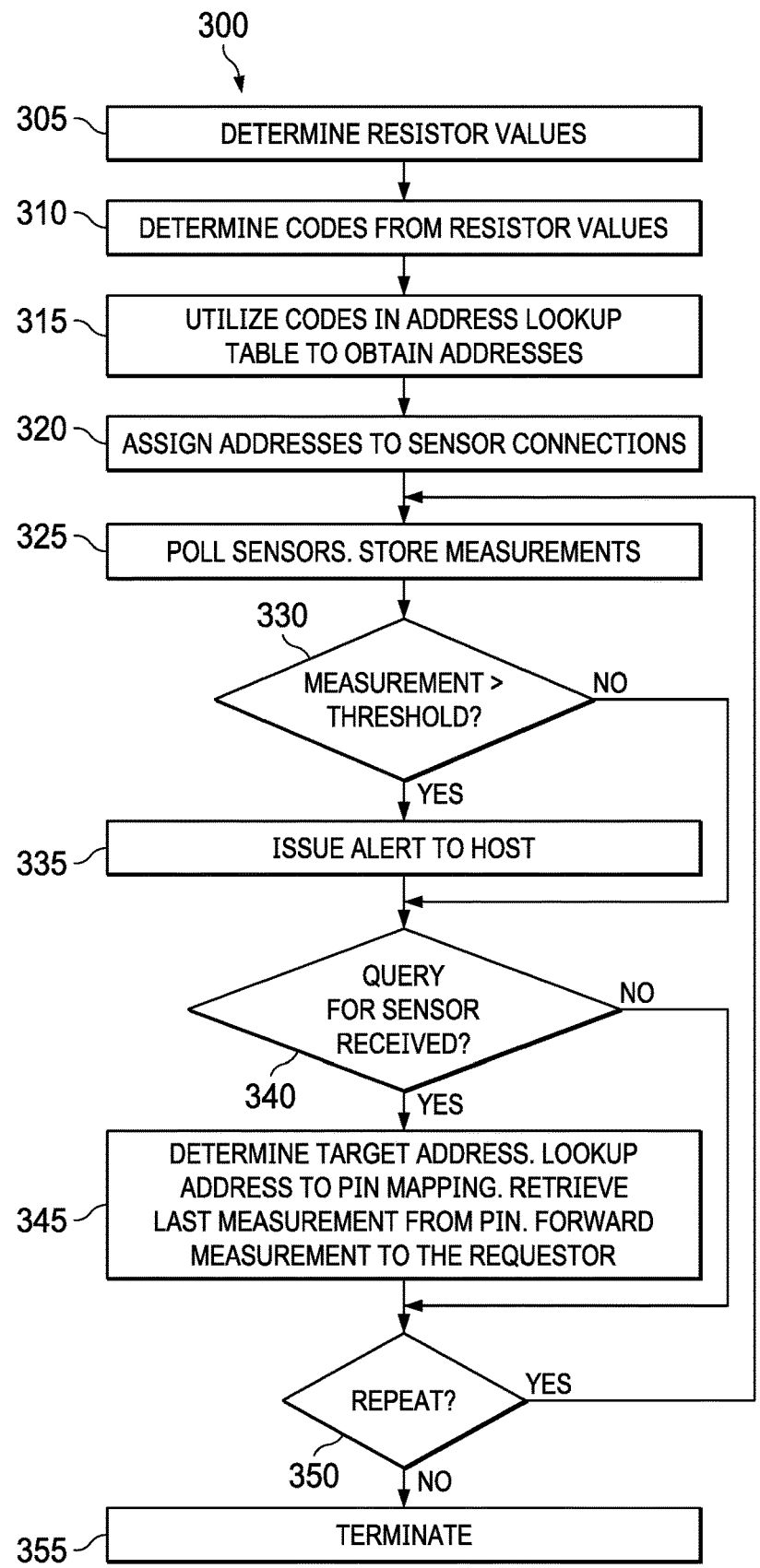
FIG. 3 is an illustration of a method for monitoring temperature or other measurements, according to embodiments of the present disclosure

FIG. 3 is an illustration of a method 300 for monitoring temperature or other measurements, according to embodiments of the present disclosure. Method 300 may be performed by, for example, circuit 104. Method 300 may be implemented by the execution of instructions by a processor, analog circuitry, digital circuitry, or any suitable combination thereof. Method 300 may be implemented with more or fewer steps than shown in FIG. 3. Any suitable steps of method 300 may be repeated, omitted, performed recursively, or performed in a different order than shown in FIG. 3.

At step 305, resistor values of a system may be determined. The resistor values may have been selected by a designer of the system to identify addresses that are to be used in communicating with sensors. Resistor values may be measured by evaluating the response of the resistors to known current or voltage. The measured resistor values may be matched against known, established resistor values. A match may be identified if a measured resistor value is within a given range of a known, established resistor value, such as five percent. Furthermore, a match may be identified based upon the closest known, established resistor value to the measured resistor value. Step 305 may be performed for any suitable number of resistors in the system. The known, established resistor values may be obtained as a result of step 305.

At step 310, the determined resistor values may be associated with coded values. Each resistor may be associated with a coded value, wherein the determined value of the resistor may be translated into a coded value. The coded values may be, for example, indices for a lookup table.

At step 315, the codes may be used to access a lookup table or other data structure. A given element of the data structure may include a series of addresses that correspond to addresses to be used to access sensors of the system.

At step 320, the series of addresses may be used to map sensors—or pins that are to be connected to sensors—to address values. Such an assignment might not include providing assignment information to the sensors themselves.

At step 325, the sensors may be polled to determine their respective measurements. The sensors may be polled sequentially, by even-numbered or odd-numbered sensors, or in any other suitable manner. Upon receipt of a measurement from a given sensor, the value may be stored.

At step 330, it may be determined whether a given measurement, or any of the measurements, exceeds a respective threshold. The threshold may be an upper threshold, lower threshold, or a combination of an upper and a lower threshold defining an acceptable range for the measurement. The respective threshold may be particular to a given sensor or may be applicable to some or all sensors. If a measurement exceeds a threshold, method 300 may proceed to step 335. Otherwise, method 300 may proceed to step 340.

At step 335, an alert may be issued to a host or other suitable entity that should receive information that a measurement exceeded a threshold. Method 300 may proceed to step 340.

At step 340, it may be determined whether a query for any sensor has been received. If a query has been received, method 300 may proceed to step 345. Otherwise method 300 may proceed to step 350.

At step 345, the target address of the query may be determined from the query. The target address may be specified by a number of bits. The target address may be matched against the mapping of addresses to pins performed in step 320 to determine a pin for the sensor. A most recent measurement made in step 325 for the sensor mapped to the determined pin may be retrieved and forwarded to the requestor. Method 300 may proceed to step 350.

At step 350, it may be determined whether method 300 will continue to take measurements. Such a determination may be based upon, for example, settings of an application relying upon such measurements. If such an application terminates, method 300 may terminate as well. If method 300 is to continue operating, method 300 may return to, for example, step 325. In another example, method 300 might return to step 305 if resistor values must again be determined. Otherwise, at step 355, method 300 may terminate.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

We claim:

1. A system, comprising:
a conditioning circuit;
a first resistor connected to a first pin of the conditioning circuit;
a second resistor connected to a second pin of the conditioning circuit;
a first measurement sensor connected to the conditioning circuit; and
a second measurement sensor connected to the conditioning circuit; and
wherein the conditioning circuit is configured to:
determine a first resistance value of the first resistor;
determine a second resistance value of the second resistor; and
determine a set of addresses for the first measurement sensor and the second measurement sensor based upon a combination of the first resistance value and the second resistance value.

2. The system of claim 1, wherein the conditioning circuit is further configured to assign unique addresses for each of the first measurement sensor and the second measurement from the set of addresses.

3. The system of claim 2, wherein the conditioning circuit is further configured to assign unique addresses for each of the first measurement sensor and the second measurement from the set of addresses, including:
a first assignment of a first pin of the conditioning circuit to the first measurement sensor; and
a second assignment of a second pin of the conditioning circuit to the second measurement sensor.

4. The system of claim 2, wherein the conditioning circuit is further configured to assign unique addresses for each of the first measurement sensor and the second measurement from the set of addresses, including:
a first assignment of a first pin of the conditioning circuit to a first terminal of the first measurement sensor;
a second assignment of a second pin of the conditioning circuit to a first terminal of the second measurement sensor;
a third assignment of the first pin of the conditioning circuit to a second terminal of the first measurement sensor; and
a fourth assignment of the second pin of the conditioning circuit to a second terminal of the second measurement sensor.

5. The system of claim 1, wherein the conditioning circuit is further configured to periodically store measurements from the first measurement sensor and the second measurement sensor.

6. The system of claim 1, wherein the conditioning circuit is further configured to:
compare a first measurement from the first measurement sensor against a first threshold;
compare a second measurement from the second measurement sensor against a second threshold; and
if the first measurement exceeds the first threshold or the second measurement exceeds the second threshold, issue an alert to a measurement monitoring process.

7. The system of claim 1, wherein the conditioning circuit is further configured to:
receive a query for a first address, the first address included in the set of addresses, from a host; and
provide a measurement status of the first measurement sensor using an association of the first address with the first measurement sensor.

8. An apparatus, comprising:
a plurality of input and output pins; and
a conditioning circuit configured to:
determine a first resistance value of a first resistor connected to a first pin of the input and output pins;
determine a second resistance value of a second resistor connected to a second pin of the input and output pins; and
determine a set of addresses for a first measurement sensor and a second measurement sensor based upon a combination of the first resistance value and the second resistance value, the first measurement sensor and the second measurement sensor connected to the conditioning circuit through the input and output pins.

9. The apparatus of claim 8, wherein the conditioning circuit is further configured to assign unique addresses for each of the first measurement sensor and the second measurement from the set of addresses.

10. The apparatus of claim 9, wherein the conditioning circuit is further configured to assign unique addresses for each of the first measurement sensor and the second measurement from the set of addresses, including:
a first assignment of a first pin of the input and output pins to the first measurement sensor; and
a second assignment of a second pin of the input and output pins to the second measurement sensor.

11. The apparatus of claim 9, wherein the conditioning circuit is further configured to assign unique addresses for each of the first measurement sensor and the second measurement from the set of addresses, including:
a first assignment of a first pin of the input and output pins to a first terminal of the first measurement sensor;
a second assignment of a second pin of the input and output pins to a first terminal of the second measurement sensor;
a third assignment of the first pin of the input and output pins to a second terminal of the first measurement sensor; and
a fourth assignment of the second pin of the input and output pins to a second terminal of the second measurement sensor.

12. The apparatus of claim 8, wherein the conditioning circuit is further configured to periodically store measurements from the first measurement sensor and the second measurement sensor.

13. The apparatus of claim 8, wherein the conditioning circuit is further configured to:
compare a first measurement from the first measurement sensor against a first threshold;
compare a second measurement from the second measurement sensor against a second threshold; and
if the first measurement exceeds the first threshold or the second measurement exceeds the second threshold, issue an alert to a measurement monitoring process.

14. The apparatus of claim 8, wherein the conditioning circuit is further configured to:
receive a query for a first address, the first address included in the set of addresses, from a host; and
provide a measurement status of the first measurement sensor using an association of the first address with the first measurement sensor.

15. A method, comprising:
determining a first resistance value of a first resistor connected to a first pin of input and output pins of a conditioning circuit;
determining a second resistance value of a second resistor connected to a second pin of input and output pins of a conditioning circuit; and
determining a set of addresses for a first measurement sensor and a second measurement sensor based upon a combination of the first resistance value and the second resistance value, the first measurement sensor and the second measurement sensor connected to the conditioning circuit through the input and output pins.

16. The method of claim 15, further comprising assigning unique addresses for each of the first measurement sensor and the second measurement from the set of addresses.

17. The method of claim 16, further comprising assigning unique addresses for each of the first measurement sensor and the second measurement from the set of addresses, including:
a first assignment of a first pin of the input and output pins to the first measurement sensor; and
a second assignment of a second pin of the input and output pins to the second measurement sensor.

18. The method of claim 16, further comprising assigning unique addresses for each of the first measurement sensor and the second measurement from the set of addresses, including:
   making a first assignment of a first pin of the input and output pins to a first terminal of the first measurement sensor;
   making a second assignment of a second pin of the input and output pins to a first terminal of the second measurement sensor;
   making a third assignment of the first pin of the input and output pins to a second terminal of the first measurement sensor; and
   making a fourth assignment of the second pin of the input and output pins to a second terminal of the second measurement sensor.

19. The method of claim 15, further comprising periodically storing measurements from the first measurement sensor and the second measurement sensor.

20. The method of claim 15, further comprising:
   comparing a first measurement from the first measurement sensor against a first threshold;
   comparing a second measurement from the second measurement sensor against a second threshold; and
   if the first measurement exceeds the first threshold or the second measurement exceeds the second threshold, issuing an alert to a measurement monitoring process.

21. The method of claim 15, further comprising:
   receiving a query for a first address, the first address included in the set of addresses, from a host; and
   providing a measurement status of the first measurement sensor using an association of the first address with the first measurement sensor.

* * * * *